Figure 1:
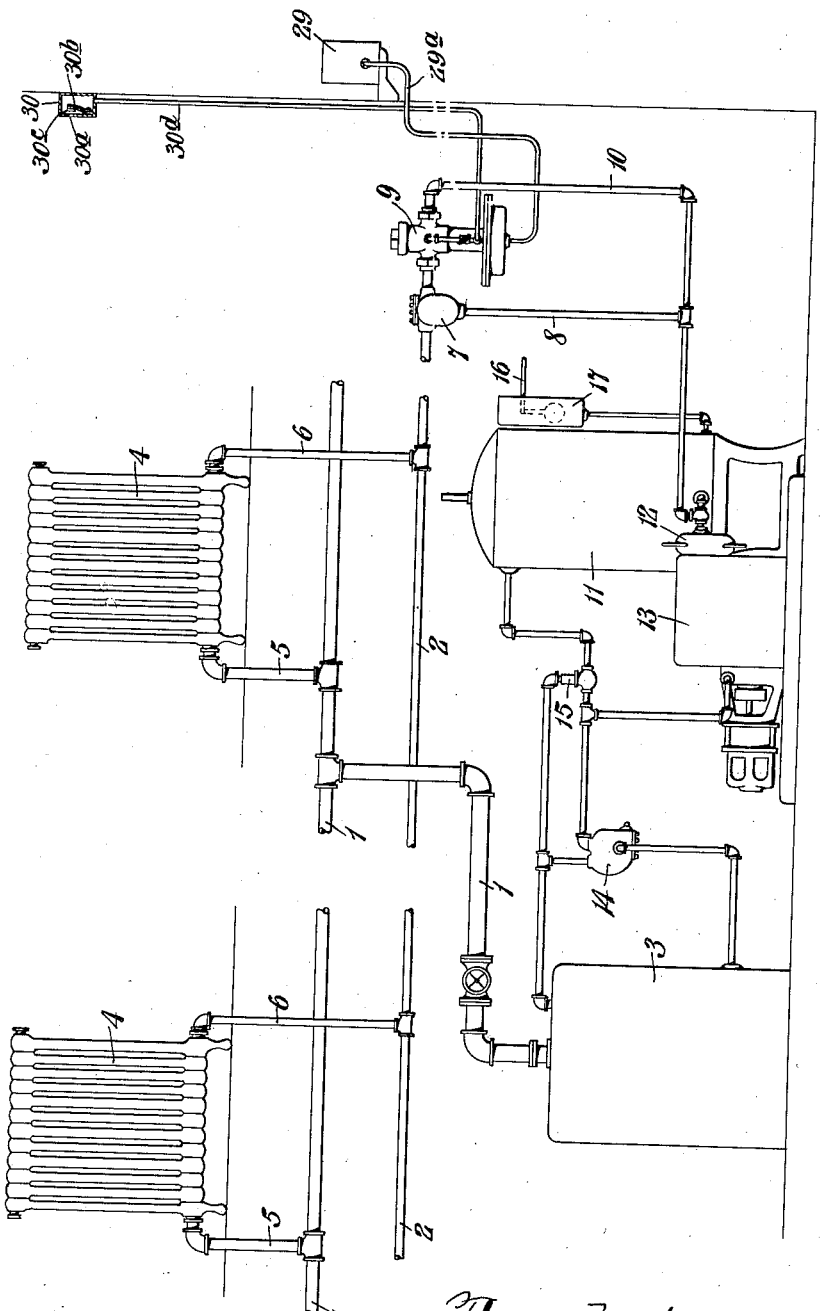

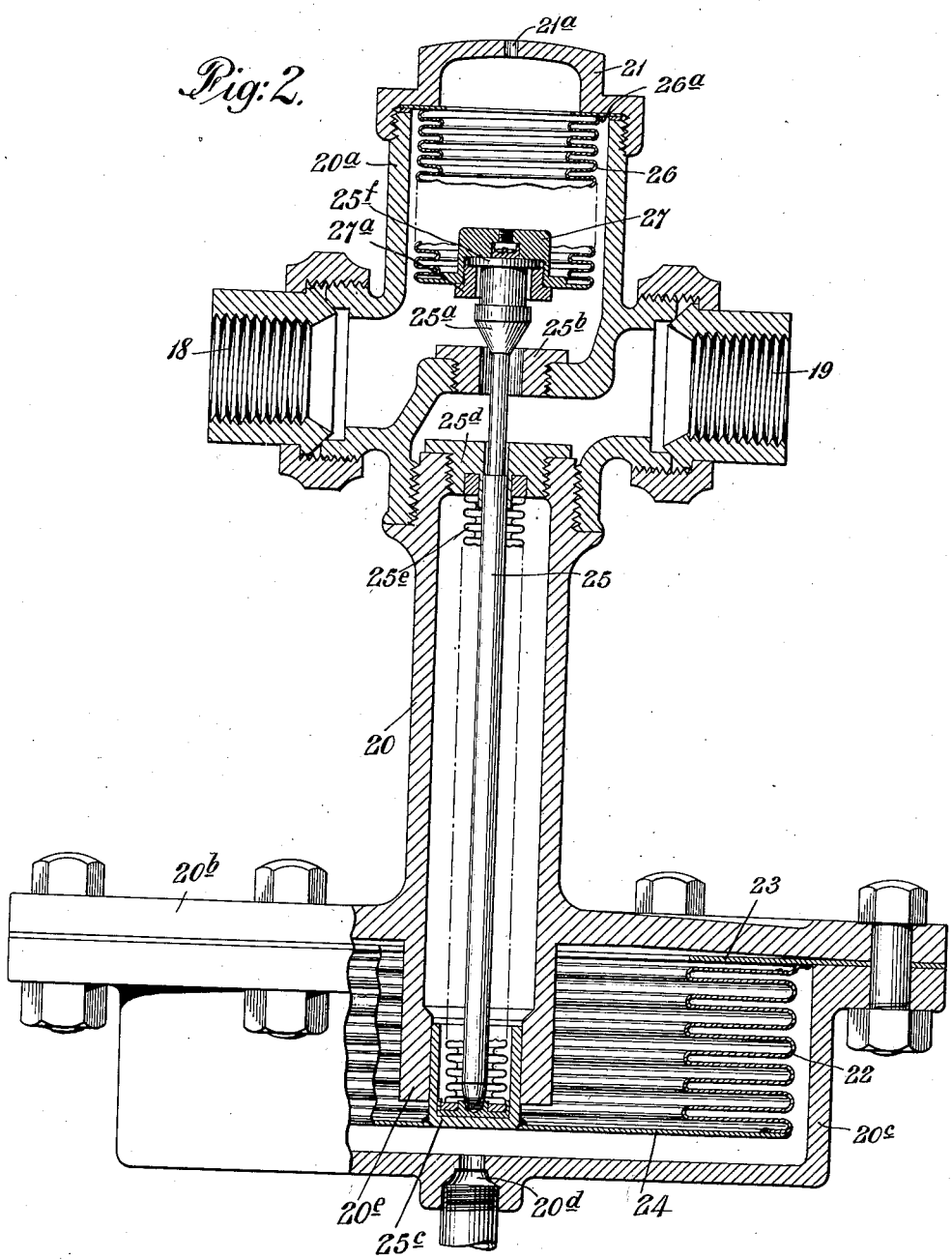

July 7, 1936.    T. N. ADLAM    2,046,760
HEATING APPARATUS
Filed Oct. 3, 1931    3 Sheets-Sheet 3
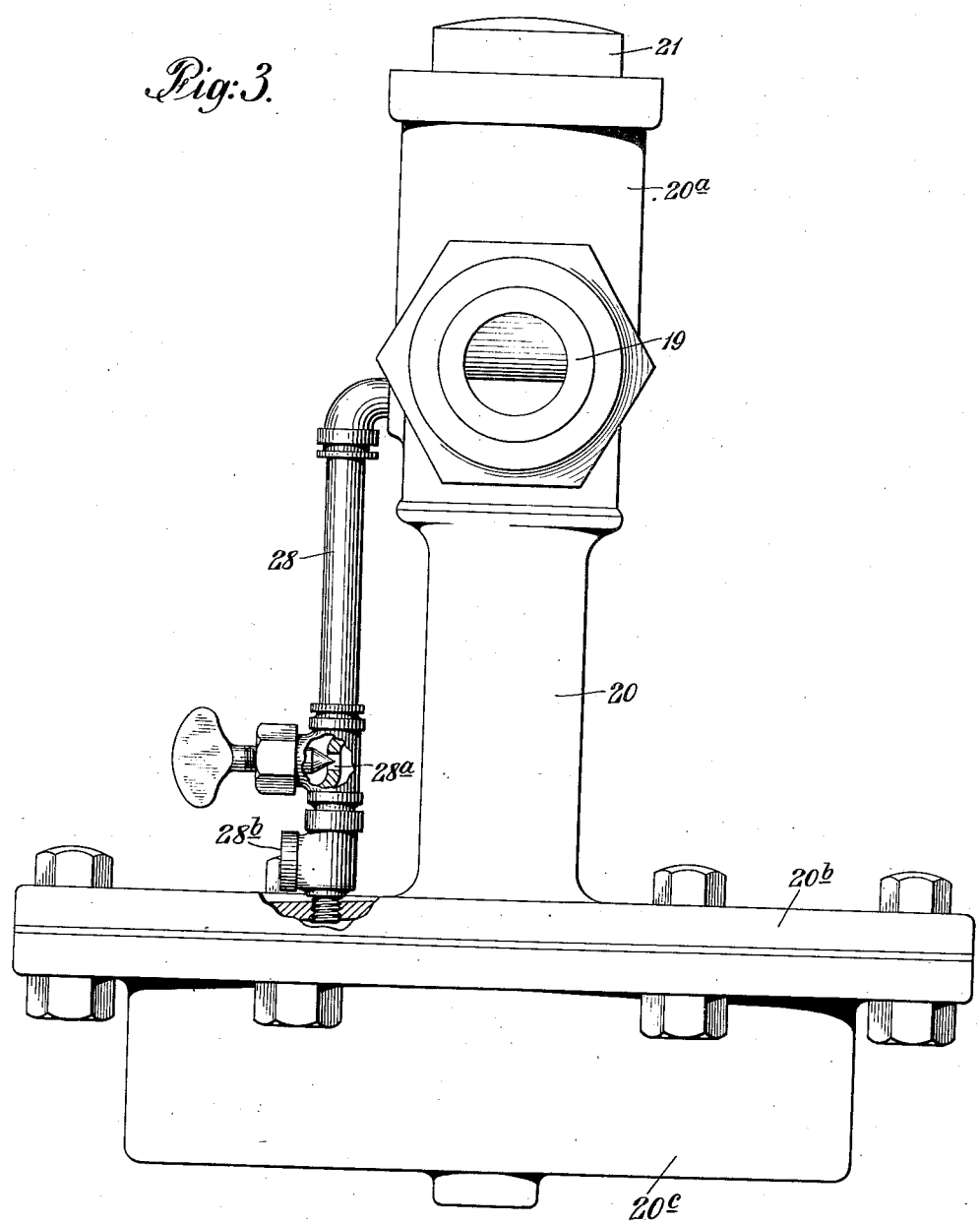

Patented July 7, 1936

2,046,760

UNITED STATES PATENT OFFICE 2,046,760

HEATING APPARATUS

Thomas Napier Adlam, Bethlehem, Pa., assignor to Sarco Company, Inc., a corporation of New York Application October 3, 1931, Serial No. 566,637

3 Claims. (Cl. 237—9)

This invention relates to the automatic control of the heating fluid in a heating system, such as the heating of buildings by steam and likewise the control of the heating fluid for other purposes where applicable.

The main object of the present invention is to regulate the control of the heating fluid so as to give a continuous regulation and control of the heating fluid under varying conditions and to accomplish this by the coaction of different means when the conditions, or any one condition, affecting the control varies so as to give a refined and desired regulation as determined by the different factors affecting the control. The invention is particularly applicable to heating systems wherein a variable pressure is imposed upon the return of the system for controlling the temperature of the heating unit or units; and in such a system my invention, as regards one feature thereof, secures a desired adjustment of the regulating valve in the return of the system for controlling the pressure imposed upon the system according to the combined effect of the temperature at a selected key position and according to the vacuum, or absolute pressure, actually imposed upon the system. This combined control avoids the intermittent opening and closing of the controlling valve and maintains this valve in a determined position as long as the temperature at the key location and the pressure imposed upon the system remains unchanged. Another object of the invention is to further control the adjustment of the regulating valve according to the temperature or other controlling factor at a particular location, such as the resulting temperature in the room or hall of a building subject also to the main control. Other objects of this invention are to provide control and regulating apparatus of the character described which will be dependable in operation and economical in cost. Another object is to improve the efficiency and cost of operation by a refined regulation of the heating fluid so that the minimum amount of heat energy is expended for securing the required results.

My invention will be understood from the following description and accompanying drawings wherein Fig. 1 is a front elevation of a system embodying my invention applied to a steam or vapor heating system; Fig. 2 is a vertical section of one form of regulating valve; and Fig. 3 is a side elevation of the regulating valve, partly broken away and partly in section.

The layout of a system embodying my invention will, of course, depend upon the particular requirements of the building to be heated and the number of heating elements and relative location, but for the sake of clearness, I have indicated in Fig. 1, a heating system with one main steam supply pipe 1 and one common return pipe 2. The boiler for supplying steam to the main pipe 1 is indicated at 3, although the main steam pipe may be connected to any central steam supply, or other source of steam. The radiators or heating elements 4 are located in different parts of the building, as may be desired. They are connected to the main supply pipe by risers 5 and to the common return pipe by individual return pipes 6. The return is connected to a trap 7, of any known form, which passes the condensate through the pipe 8. The return 2 after passing through the trap 7 continues to the regulating valve generally indicated by the reference character 9, the return vapor passing through it and through the pipe 10. The latter pipe unites with the pipe 8 and is connected to the condensate reservoir 11 and through a strainer 12 to the pump 13. The outlet of this pump is connected with the top of the reservoir 11 and also to a device 14 which automatically feeds return water to the boiler for maintaining the water therein at a predetermined level. Pipes connect the upper and lower portions of the boiler with the level maintainer 14 in order to equalize the pressure therein and insure the proper water level in each. Excess water is maintained in the reservoir 11 and a surplus pressure valve 15 insures sufficient pressure being maintained in the pump discharge for overcoming the pressure in the boiler to permit the passage of water thereto as controlled by the water level maintainer 14. An auxiliary supply pipe 16 is connected to the reservoir 11 through any suitable form of water level maintaining device 17 for the purpose of supplying water to the reservoir as required in order to maintain a predetermined water level therein.

Passing now to the structure of the regulating valve 9 and its interconnections and controlling parts, one form thereof will be understood from Figs. 2 and 3. The inlet to this valve from the return of the system is indicated at 18, and the outlet to the vacuum pump 13 is indicated at 19. The main body portion 20 of the valve has an upper portion 20a which is closed by a cap 21. The lower portion of the valve is expanded in the form of a plate 20b, to which is secured on its under side a hollow cylindrical box portion 20c. Within this cylindrical portion is located a flexible element responsive to variations in pressure and shown in the form of an expansible and contractible bellows type element 22. The upper portion of this element is hermetically sealed by connection to a plate 23 in the form of a ring which is clamped between the flanges of the portions 20b and 20c of the valve. The lower portion of the bellows 22 is hermetically sealed by a plate 24. The lower surface of the portion 20c of the valve is perforated to receive a pipe connection at 20d. Thus the plate 24 is subjected on its lower side to the pressure imparted through the opening 20d and on its upper side to pressure imposed thereon, with the result that the plate 24 will tend to assume and maintain a position determined by the difference in pressure on the two sides of the plate 24, according to their respective exposed areas.

Within the vertical portion of the valve is a rod 25 which carries at its upper end a valve element 25a adapted to seat against the valve seat 25b when the valve stem 25 is moved downwardly. Below the plate portion 20b of the valve and extending within the middle portion of the bellows 22, is a cylindrical projection 20e. This forms a guide for a cylindrical cup-shaped element 25c which is united at its bottom with the plate 24. This element 25c has a sliding fit with the interior of the extension 20e and has fixedly secured thereto, in any suitable manner, the lower end of the valve stem 25. The upper portion of the valve stem 25 has a sliding fit with the interior of a nut 25d which nut engages with and closes the upper intermediate portion of the valve body 20, thereby preventing the central portion of the valve from being subjected to the pressure at the upper portion thereof. An expansible and contractible element 25e, shown in the form of a bellows, surrounds the main portion of the valve stem 25, being hermetically sealed at its upper end to the lower face of the nut 25d, and at its lower end to the interior of the element 25c. The bellows 25e evidently seals the pressure to which the interior of the bellows 22 is subjected from the pressure imposed upon the valve outlet 19 or, when the valve is open, the degree of vacuum or absolute pressure imposed upon the return of the system.

In the upper portion of the regulating valve is located within the portion 20a, another flexible pressure responsive element 26, shown in the form of a corrugated or bellows type responsive device. The upper end is hermetically sealed and connected with a ring 26a which is held in place between the cap 21 and the body portion 20a. The cap 21 is perforated as at 21a, so that the interior of the bellows 26 is subjected to atmospheric pressure. The lower end of the bellows 26 is closed by the plate or flange of a hollow nut 27 which is located within the lower portion of the bellows and receives a nut 27a at its interior lower end. In the space between the upper end of the nut 27a and the interior portion of the nut 27 is located a flange 25f on the upper end of the valve stem. The position of the valve 25a is, therefore, additionally controlled by the difference between atmosperic pressure within the bellows 26 and the vapor pressure at the valve imposed upon the return of the system.

Referring to Fig. 3, a by-pass 28 has its upper end connected, through the body portion of the valve, with the outlet 19 thereof, just below the valve seat 25b. The lower end of the by-pass connects, through an opening in the plate 20b, with the interior of the bellows 22. In the pipe 28 is shown an adjustable valve 28a which restricts the passage of air, or vapor, through this pipe to a limited amount and permits adjustment to the proper amount for securing the desired operation. In this by-pass and below the valve 28a, is located a T providing an outlet 28b for connection to a controlling device.

Referring to Fig. 1, a controlling device 29 is located at any desired key location, such as outside the building so as to be subjected, for example, to changes in the outside temperature and thereby exert a controlling effect upon the regulating valve 9. This device 29 is connected by a tube, or pipe connection, 29a to the opening 20d at the bottom of the regulating valve. The device 29 is indicated as a closed vessel and may contain air, or any other gas, volatile fluid, or any expansible fluid, which will exert variable pressures under the plate 24 of the regulating valve corresponding with changes of the outside temperature. Any suitable form of controlling device might be used for this purpose and, of course, may be responsive to other changes than outside temperature changes, according to particular requirements.

Another controlling device 30 is shown in Fig. 1 located in any desired selected position so as to be responsive, for example, to inside temperature changes, such as a room, hall or other part of the building. This device is shown in the form of a box having an opening 30a to the atmosphere adapted to be closed or opened by a device responsive to temperature changes. This is indicated as a bi-metallic strip 30b fixed at one end and carrying an element 30c at its other end, which is adapted to close the opening 30a when the temperature rises to a predetermined limit; and to open the opening when the temperature falls below this limit. The device 30 has a tube, or pipe connection, 30d from its interior and extends to and is connected with the outlet 28b in the by-pass 28.

The heating control and regulation thereof is determined by the position to which the regulating valve is adjusted; and, in the particular form described, this is dependent upon several different factors. When the regulating valve is open to its maximum amount, the pump 13 is given full opportunity to impose its full degree of vacuum, or lowest absolute pressure, upon the returns of the system and thereby reduce the temperature of and heating which the radiators 4 are permitted to yield. By adjustment of the valve to various intermediate positions according to the controlling effects, the degree of vacuum or pressure imposed upon the system is made such that the temperature of the steam and of the heating elements and the heat delivered thereby is made to correspond with the required amount. By locating the trap 7 in the return before its connection with the regulating valve, the condensate is separated from the steam, or vapor, and returns to the pump, or reservoir, without passing through the regulating valve. This permits the regulating valve to be made smaller than would be the case if it were required to pass the condensate as well as the return vapor.

The operation may be understood by assuming the regulating valve to be adjusted to a certain position and first considering the effect of a rise in the outside temperature. This will cause the air or fluid in the vessel 29 to expand and to increase the pressure on the under side of the plate 24 and thereby cause the valve element 25a to be moved further away from its seat. This further opening of the valve permits the vacuum pump to act more effectively in reducing the absolute pressure imposed upon the return of the system and thereby reduce the delivery of heat from the heating elements 4. The lowering of the absolute pressure in the return of the system will cause reduction of the pressure on the plate or lower exposed area of the end of the bellows 26. As the inside of this bellows is exposed to atmospheric pressure, the lowering of the absolute pressure in the return pipe causes a downward force to be exerted against the upward force due to the increased pressure on the under side of plate 24. This results in the valve assuming an intermediate position of adjustment which corresponds to that required by and imposed by the outside temperature. It will be noted that the exposed area of the plate 24 is much larger than the exposed area of the lower outside end of the bellows 26 and these areas are relatively proportioned so that the valve will assume an adjusted intermediate position corresponding to that required and resulting from the differential upward and downward pressures exerted on the plate 24 and the lower outside end of the bellows 26 respectively.

A further control of the regulating valve may be used for causing the valve to also be responsive to change of temperature at some other point, such as by location of the device 30 so as to be subjected to the inside temperature at any particular location. This control will cause the regulating valve to open to its maximum amount when the temperature of the room, or point of location of the device 30, reaches a predetermined limit. Under normal conditions, the thermostatic responsive device will assume a position so that the hole 30a is open, thus imposing on the pipe 30d and its connection to the outlet 28b and on the inside of the bellows 22 a pressure corresponding to atmospheric pressure. Of course, the restricted opening in the valve 28a in the by-pass, tends to impose a reduced pressure on the inner surface of the plate 24 and within the bellows 22 by reason of this by-pass connection between the comparatively low pressure of the return pipe and the interior of the bellows 22. But the opening of the valve 28a is adjusted to be restricted in the by-pass connection while the opening 30a and its pipe connection to the by-pass below the valve 28a is sufficiently large to offset and overcome the effect of the restricted opening in the valve 28a. That is, the upper surface of the plate 24 and interior of the bellows 22c is subjected substantially to atmospheric pressure when the hole 30a is open. Now suppose the temperature at the key position of the device 30 rises to a predetermined limit such that the thermostat causes the closing of the hole 30a. This prevents air from entering and results in the passage of air from within the bellows 22 through the restricted valve 28a to the return line of the system which is below atmospheric pressure. This obviously reduces the pressure within the bellows 22 and on the upper side of the plate 24 and disturbs the balanced effect of the two differentially acting pressure devices previously described, and results in the plate 24 being moved upwardly against the reduced pressure on its opposite side and so opens the regulating valve to its fullest extent. This permits the full vacuum exerted by the pump 13 to be transmitted to the return line 2 of the system and thereby reduces the temperature and heating effect of the radiators 4. When the temperature of the air at the region of the device 30 falls below the predetermined amount, the hole 30a is automatically opened. This causes the pressure upon the plate 24 to reach approximate atmospheric pressure; and the regulating valve then assumes its balanced condition as determined by the temperature of the outside air at the location of the device 29.

Although I have described one particular embodiment of this invention, it will be understood that the same may be embodied in various forms of construction of the different parts and that various changes may be made without departing from the scope of the invention.

I claim:

1. The combination of a heating unit having a supply of heating fluid thereto and a return therefrom, a valve in the return for regulating the pressure imposed upon the return, said valve comprising a movable valve element, a flexible device responsive to increase of pressure tending to move said element in a direction to open said valve, a second flexible device responsive to decrease of pressure of the return fluid passing through the valve tending to move said valve element in a direction to close said valve, a device responsive to temperature changes affecting the required heat output of the heating unit for controlling the pressure imposed upon said first-named flexible device, and increasing said pressure with increase of temperature, a restricted by-pass connection from the path of the return fluid controlled by the valve to the side of said first-named device which is not subjected to said controlling pressure, and a second temperature responsive device connected with said by-pass for preventing the by-pass from having full effect when the temperature of said second temperature responsive device is below a predetermined limit and for permitting the by-pass to have full effect upon said first-named device when the temperature of said second temperature responsive device exceeds a predetermined limit.

2. The combination of a heating unit having a supply of heating fluid thereto and a return therefrom, a valve in the return for regulating the pressure imposed upon the return, said valve comprising a movable valve element, a flexible device responsive to a controlling pressure tending to move said element to open position with increase of pressure, a flexible device responsive to the pressure in the return tending to move said element to closed position upon decrease of pressure in the return, means for maintaining a substantially constant pressure upon one side of said first-named pressure device, a restricted by-pass connection between said means and said return, and means responsive to a predetermined maximum temperature affecting the required output of said heating unit for interrupting the maintenance of said substantially constant pressure and permitting said restricted by-pass to have effect in reducing said constant pressure and thereby cause said valve element to be opened to its maximum amount.

3. The combination of a heating unit having a supply of heating fluid thereto and a return therefrom, a valve in the return for regulating the pressure imposed upon the return, said valve comprising a movable valve element, a flexible device connected to said valve element, a connection to one side of said device for imposing a controlling pressure thereon tending to move said valve element to open position, a second flexible device connected to said valve element having a substantially constant pressure on one side thereof and subjected to the pressure in said return on the other side thereof and tending to move said valve element to closed position upon reduction of pressure in said return, a restricted by-pass from said return to one side of said first-named pressure device opposite from the side receiving the controlling pressure, a connection to said by-pass for imposing a substantially constant pressure on the side of said first-named pressure device to which said by-pass is connected, and means responsive to a predetermined maximum temperature affecting the required output of said heating unit for interrupting the maintenance of said substantially constant pressure and thereby permitting said restricted by-pass to change the pressure on one side of said first-named device and cause the full opening of said valve element.

THOMAS NAPIER ADLAM.